United States Patent
Eo et al.

(10) Patent No.: US 10,072,733 B2
(45) Date of Patent: Sep. 11, 2018

(54) AUTOMATED MANUAL TRANSMISSION

(71) Applicant: Hyundai Motor Company, Seoul (KR)

(72) Inventors: Soon Ki Eo, Ansan-si (KR); Chon Ok Kim, Yongin-si (KR); Chae Hong Lim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 398 days.

(21) Appl. No.: 14/946,145

(22) Filed: Nov. 19, 2015

(65) Prior Publication Data

US 2017/0059006 A1 Mar. 2, 2017

(30) Foreign Application Priority Data

Aug. 24, 2015 (KR) .......................... 10-2015-0118674

(51) Int. Cl.
- F16H 3/08 (2006.01)
- F16H 3/091 (2006.01)
- F16H 3/00 (2006.01)

(52) U.S. Cl.
CPC ............ *F16H 3/091* (2013.01); *F16H 3/006* (2013.01); *F16H 2003/007* (2013.01); *F16H 2200/0047* (2013.01)

(58) Field of Classification Search
CPC ........... F16H 37/021; F16H 2003/0931; F16H 2003/007; F16H 2003/008
USPC .................................. 74/330, 331, 333, 340
See application file for complete search history.

(56) References Cited

U.S. PATENT DOCUMENTS

| | | | |
|---|---|---|---|
| 3,769,857 A * | 11/1973 | Whateley | F16H 3/0915 74/330 |
| 4,023,418 A * | 5/1977 | Zenker | B60K 17/08 74/15.86 |
| 4,594,908 A | 6/1986 | Akashi et al. | |
| 6,895,832 B2 * | 5/2005 | Ishihara | B60W 10/02 192/53.32 |
| 7,107,866 B2 * | 9/2006 | Baldwin | F16H 3/006 74/331 |
| 8,429,992 B2 * | 4/2013 | Braford | F16H 3/006 74/331 |

FOREIGN PATENT DOCUMENTS

| | | |
|---|---|---|
| JP | 2001-234989 A | 8/2001 |
| JP | 2010117007 | 5/2010 |
| KR | 20130115618 | 10/2013 |

* cited by examiner

*Primary Examiner* — Ha Dinh Ho
(74) *Attorney, Agent, or Firm* — Brinks Gilson & Lione

(57) ABSTRACT

An automated manual transmission includes: a first input shaft configured to receive rotation power from a power source via a main clutch and a second input shaft configured to always receive the rotation power from the power source. A gearbox part is configured to have a plurality of shifting gear pairs having different gear ratios engaged with the first input shaft and an output shaft and select the shifting gear pair suited for a driving speed by a synchronizer. A counter shaft is configured to be disposed in parallel with the output shaft, and an assist input gear is configured to be coupled with the counter shaft via an assist clutch and engaged with an output gear provided at the output shaft to form a gear ratio of a specific shifting stage.

7 Claims, 5 Drawing Sheets

AUTOMATED MANUAL TRANSMISSION

CROSS-REFERENCE TO RELATED APPLICATIONS

This application claims the benefit of Korean Patent Application No. 10-2015-0118674, filed on Aug. 24, 2015, the contents of which are incorporated herein by reference in its entirety.

FIELD

The present disclosure relates to an automated manual transmission.

BACKGROUND

The statements in this section merely provide background information related to the present disclosure and may not constitute prior art.

An automated manual transmission is automatically shifted by an actuator during driving of a vehicle to be able to provide driving convenience similar to that of an automatic transmission and transmits power more efficiently than the automatic transmission to be able to contribute to improvement in fuel efficiency of a vehicle.

The automated manual transmission is an apparatus which uses a hydraulic & pneumatic actuator of the existing manual transmission not for a user, but for a transmission control unit (TCU) to automatically perform a shifting process by a gear control.

Meanwhile, simply describing an automated manual transmission (AMT) system performing a torque assist in a vehicle in which the automated manual transmission is equipped, a torque transferred from an engine is controlled by a main clutch and an assist clutch to be selectively transferred to the transmission, in which 1, 3, 4, 5, and R stages may be formed by the intermittence operation of the main clutch and a 2 stage may be formed by the intermittence operation of the assist clutch.

That is, when a shifting stage of a 1 stage or 3 stage is formed to perform a shift to a 2 stage while driving, 2 stage shifting is performed by a torque cross control of the main clutch and the assist clutch, such that a torque drop phenomenon occurring during the 2 stage shifting process may be prevented, thereby preventing a torque interruption from occurring during the shifting (similar to double clutch shifting of a dual-clutch transmission (DCT)).

However, the existing torque assist AMT system has a structure in which a two stage output gear used in the torque assist is separately provided at an output shaft and the assist clutch is provided at an end portion of an opposite side of the engine, and therefore has a concern in that a total length of the transmission may be increased and the vehicle mountability of the transmission may be reduced.

Further, compared with a disposition structure of the general manual transmission, the existing torque assist AMT system has a difference in the number of shafts, a disposition of a gear stage, etc., and therefore the transmission for the AMT is difficult to manufacture using the existing manual transmission production line.

SUMMARY

The present disclosure provides an automated manual transmission capable of improving vehicle mountability by reducing a total length of the transmission and reducing production costs of the transmission by using a production line of the existing manual transmission.

According to one form of the present disclosure, there is provided an automated manual transmission, including: a first input shaft configured to receive rotation power from a power source via a main clutch; a second input shaft configured to always receive the rotation power from the power source; a gearbox part configured to have a plurality of shifting gear pairs having different gear ratios engaged with the first input shaft and an output shaft and select the shifting gear pair suited for a driving speed by a synchronizer; a counter shaft configured to be disposed in parallel with the output shaft; and an assist input gear configured to be coupled with the counter shaft via an assist clutch and engaged with an output gear provided at the output shaft to form a gear ratio of a specific shifting stage.

The assist input gear may be engaged with any one of the output gears of the shifting gear pair provided in the gearbox part.

The automated manual transmission may further include: an idler gear set configured to be provided on a power transfer path from the second input shaft to the output shaft through the counter shaft and transfer the rotating power of the power source, which is provided at the second input shaft, to output shaft.

The idler gear set may include: a first transfer gear configured to be provided at the second input shaft; a second transfer gear configured to be provided at the counter shaft; an idler shaft configured to be disposed in parallel with the second input shaft and the counter shaft; and an idler gear configured to be provided at the idler shaft and engaged with the first transfer gear and the second transfer gear.

The idler gear may include: a first idler gear configured to be engaged with the first transfer gear while being paired with the first transfer gear; and a second idler gear configured to be engaged with the second transfer gear while being paired with the second transfer gear; and at least one of a gear ratio formed by having the first transfer gear and the first idler gear pairing with each other and a gear ratio formed by having the second transfer gear and the second idler gear pairing with each other forms a reduction gear ratio.

The second input shaft may be formed as a hollow shaft so that the first input shaft is inserted into the second input shaft, and the counter shaft may be disposed at a side portion of the gearbox part.

The main clutch may be disposed between the power source and a flywheel, the main clutch may be directly connected to the first input shaft, and the second input shaft may be formed as a hollow shaft to enclose the first input shaft.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
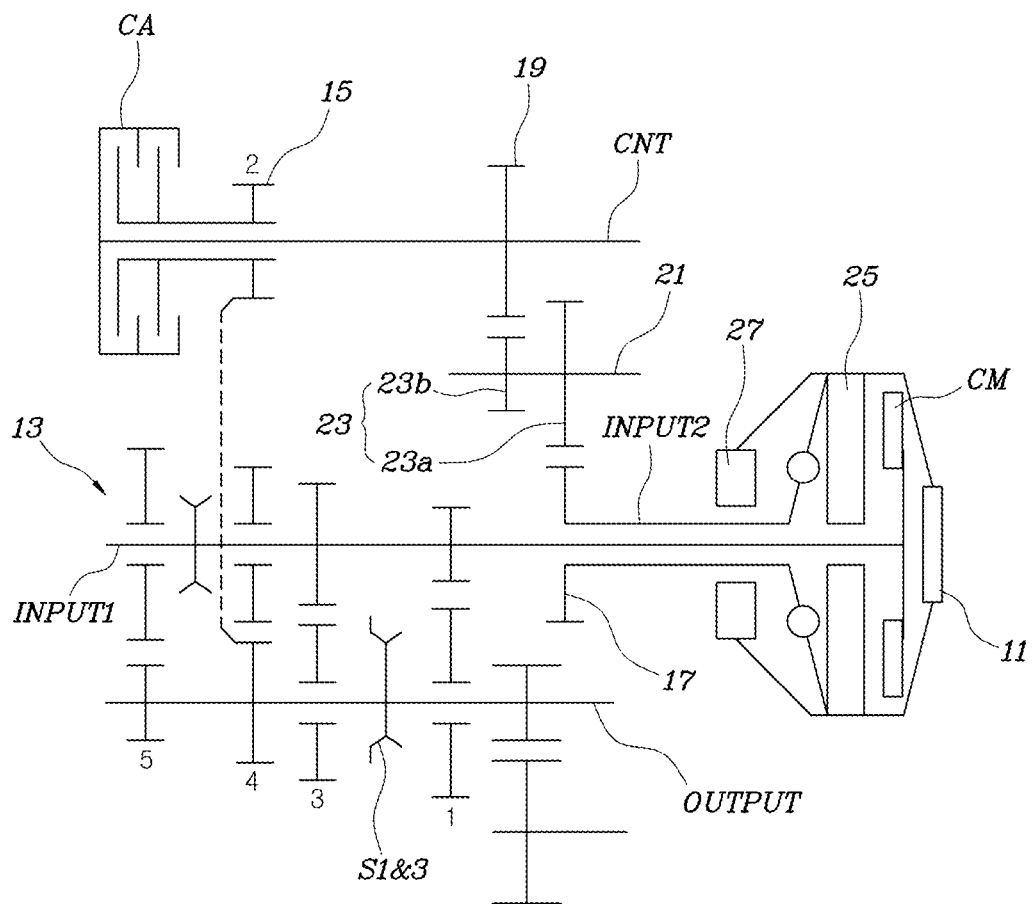
FIG. 1 is a diagram illustrating the whole structure of a torque assist automated manual transmission according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An automated manual transmission according to one form of the present disclosure is an AMT having a torque assist function and may be configured to include a first input shaft INPUT1, a second input shaft INPUT2, a gearbox part 13, a counter shaft CNT, and an assist input gear 15.

Describing in detail the present disclosure with reference to FIG. 1, first, the first input shaft INPUT1 may selectively receive rotation power from a power source via a main clutch CM.

For example, the first input shaft INPUT1 may be fixed in a state in which it is directly connected to a clutch disk configuring the main clutch CM and the clutch disk may be disposed between an engine 11 and a flywheel 25 to be intermitted by the flywheel 25. Further, the intermittence operation of the clutch disk may be made by a concentric slave cylinder CSC 27 (or other power intermittence apparatus) which is disposed between the flywheel 25 and a gearbox part 13 to be described below.

Here, the power source may be an engine 11. Further, the main clutch CM may be a dry clutch as well as all the components for intermitting power transferred from the engine 11, such as a torque converter, a fluid coupling, a power intermittence apparatus using a planetary gear, an electronic clutch using an electrical force, and a mechanical connection apparatus of a spline, a dog clutch, or the like.

The second input shaft INPUT2 may always receive the rotation power from the power source. For example, the second input shaft INPUT2 may be connected to the flywheel 25 via a damper (not illustrated) and the flywheel 25 may be fixed to the engine 11 to always receive the rotation power from the engine 11.

In this case, the second input shaft INPUT2 may be formed as a hollow shaft, such that the second input shaft INPUT2 may be inserted in a shape enclosing the first input shaft INPUT1.

That is, according to the related art, the rotation power may be provided to the assist clutch by the input shaft directly connected to the engine and several input gears of the shifting gear pair having different gear ratios are fixed to the input shaft formed as a hollow shaft while being connected to the main clutch, such that diameters of the input gears may not be further increased.

However, according to one form of the present disclosure, the rotation power is provided to the assist clutch CA through the second input shaft INPUT2 formed as the hollow shaft by changing the power transfer path by the disposition structure of the main clutch CM and the flywheel 25 and the input gears are fixed along the first input shaft INPUT1 inserted into the second input shaft INPUT2 to reduce diameters of the input gears, thereby implementing the same function as the existing torque assist AMT while reducing a weight and a size of the transmission.

The gearbox part 13 may be configured so that a plurality of shifting gear pairs having different gear ratios are engaged with the first input shaft INPUT1 and an output shaft OUTPUT and the shifting gear pair is selected to be suited for a driving speed by a synchronizer. In this case, the output shaft OUTPUT may be disposed in parallel with the first input shaft INPUT1 and thus the plurality of shifting gear pairs and the synchronizer may be disposed.

For example, the shifting gear pair for forming 1, 3, 4, 5, and R stages may be engaged with the first input shaft INPUT1 and the output shaft OUPUT and the synchronizer for selecting the corresponding shifting gear pair may be provided at the first input shaft INPUT1 or the output shaft OUPUT.

The counter shaft CNT may be disposed in parallel with the output shaft OUTPUT. For example, the counter shaft CNT may be disposed at a side portion of the gearbox part 13.

Next, the assist input gear 15 may be coupled with the counter shaft CNT via the assist clutch CA and engaged with the output gear provided at the output shaft OUTPUT to form a gear ratio of a specific shifting stage.

For example, the gear ratio of the specific shifting stage formed by the assist input gear 15 may be a 2-stage gear ratio and the assist input gear 15 may be engaged with any one of the output gears of the shifting gear pair provided in the gearbox part 13.

That is, FIG. 1 illustrates that the assist input gear 15 is engaged with the output gear for forming a 4 stage, but the assist input gear 15 may also be engaged with other output gears which are directly connected to the output shaft OUTPUT.

Further, as the assist clutch CA, a dry or wet clutch using a friction, a synchro synchronizer, a dog clutch, a power intermittence apparatus (friction band, clutches, mechanism using magnetic) using electricity and a hydraulic signal, etc., and mechanism using a latch, etc., may be applied and an apparatus for mechanically completing synchronization within a short period of time may also be applied.

According to the above configuration, the assist input gear 15 for forming the 2 stage of the present disclosure may be engaged with any one of the output gears of the shifting gear pair, such that the output gear and the synchronizer for forming the 2 stage are unnecessary and the assist input gear 15 is disposed at the side portion of the gearbox part 13, thereby reducing the total length of the transmission to improve the mountability of the vehicle.

In addition, the structure of the gearbox part 13 having the disposition structure of the existing manual transmission is applied to the torque assist AMT according to one form of the present disclosure to share the production line with the existing manual transmission, thereby reducing investment costs of production facilities to save production costs of the transmission.

Further, according to one form of the present disclosure, an idler gear set may be further provided on a power transfer path from the second input shaft INPUT2 to the output shaft OUTPUT through the counter shaft CNT and the rotating direction of the power source provided at the second input shaft INPUT2 is switched to the output OUTPUT by the idler gear set to transfer the rotation power.

For example, the idler gear set may be configured to include a first transfer gear 17, a second transfer gear 19, an idler shaft 21, and an idler gear 23.

In detail, the first transfer gear 17 may be fixed to the second input shaft INPUT2 and the second transfer gear 19 may be fixed to the counter shaft CNT. Further, the idler shaft 21 may be disposed in parallel with the second input shaft INPUT2 and the counter shaft CNT.

Further, the idler gear 23 is provided at the idler shaft 21. In this case, the idler gear 23 may be engaged with the first transfer gear 17 and the second transfer gear 19.

That is, the rotating direction of the engine 11 is switched by the idler gear 23 engaged between the first transfer gear 17 and the second transfer gear 19 to provide the rotation power to the output shaft OUTPUT, such that the rotation power corresponding to an advance 2 stage may be output through the assist input gear 15 provided at the counter shaft CNT.

In addition, the idler gear 23 may be configured to include a first idler gear 23*a* and a second idler gear 23*b*, in which the first idler gear 23*a* and the second idler gear 23*b* may be fixed to the idler shaft 21.

For example, the first idler gear 23*a* may be engaged with the first transfer gear 17 while being paired with the first transfer gear 17 and the second idler gear 23*b* may be engaged with the second transfer gear 19 while being paired with the second transfer gear 19.

In this case, at least one of a gear ratio formed by having the first transfer gear 17 and the first idler gear 23*a* pairing with each other and a gear ratio formed by having the second transfer gear 19 and the second idler gear 23*b* pairing with each other may form a reduction gear ratio.

Hereinafter, an action and an effect of the present disclosure will be described.

<N Stage→1 Stage Shifting>

Upon the initial starting of a vehicle, the second input shaft INPUT2 is directly connected to the engine 11 and thus the second input shaft INPUT2 rotates together with the counter shaft CNT. However, in this state, all the synchronizers and the assist clutch CA within the transmission are at a neutral position and thus are in a state in which a load is not applied to the rotation of the engine 11 regardless of the turn on/off of the main clutch CM.

Figure 2A:
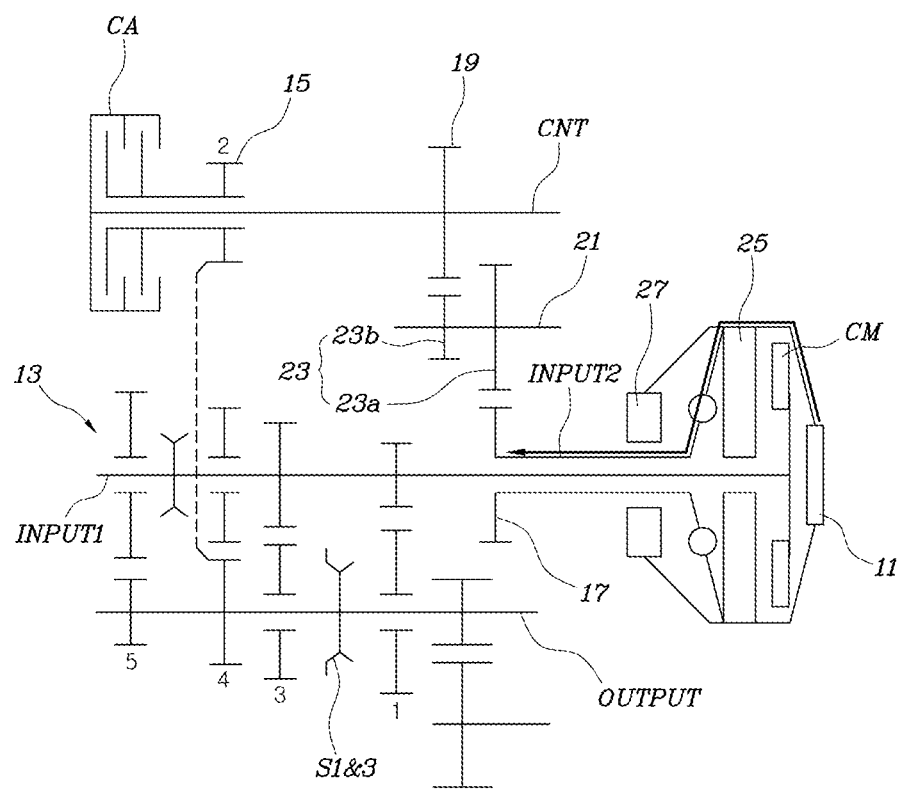
FIGS. 2A and 2B are diagrams for describing a process of performing shifting from an N stage to a 1 stage according to one form of the present disclosure.

Next, upon starting the shifting to the 1 stage, as illustrated in FIG. 2A, prior to the coupling with the main clutch CM, a 1 stage output gear is pre-coupled with the output shaft OUTPUT using a 1 & 3 stage synchronizer (S1 & 3).

Figure 2B:
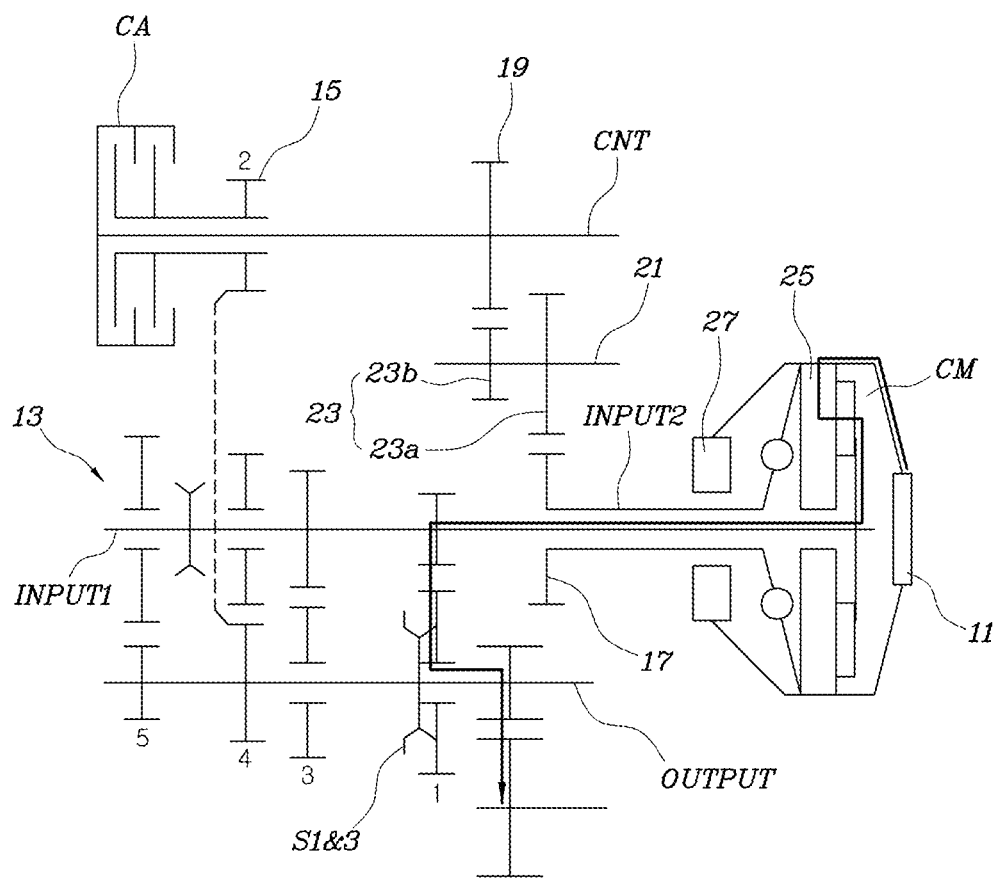

In this state, as illustrated in FIG. 2B, when a clutch C is slowly coupled, the rotation power from the engine 11 is transferred to the output shaft OUTPUT through the 1-stage shifting gear pair while starting to be transferred even through the first input shaft INPUT1, such that the vehicle may be driven at an advance 1 speed.

<1 Stage→2 Stage Shifting>

Figure 3A:
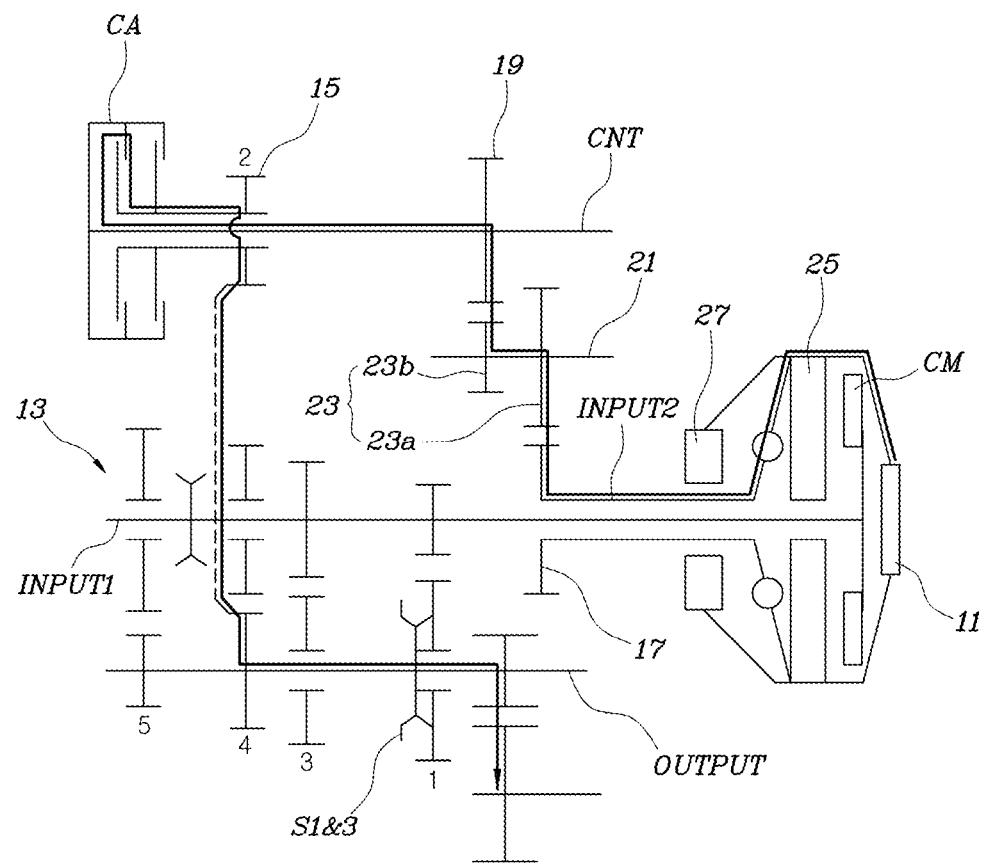
FIGS. 3A and 3B are diagrams for describing a process of performing shifting from a 1 stage to a 2 stage according one form of the present disclosure.

When the shifting from the 1 stage to the 2 stage starts, the torque cross control coupling the assist clutch CA is performed while the main clutch CM is released as illustrated in FIG. 3A in the state of FIG. 2*b*, such that the release of the main clutch CM and the coupling of the assist clutch CA may be smoothly performed simultaneously.

Next, the rotation power from the engine 11 is transferred to the counter shaft CNT through the second input shaft INPUT2 and the idler shaft 21 and is transferred to the 4-stage output gear through the assist input gear 15 provided at the counter shaft CNT to be transferred to the output shaft OUTPUT, such that the vehicle may be driven at the advance 2 speed, thereby performing the shifting while preventing the shifting sense as if the vehicle is pulled during the shifting from reducing by the foregoing torque cross control.

Further, the coupling of the main clutch CM is released as described above, such that the power of the engine 11 is no longer transferred to the 1-stage shifting gear pair.

Figure 3B:
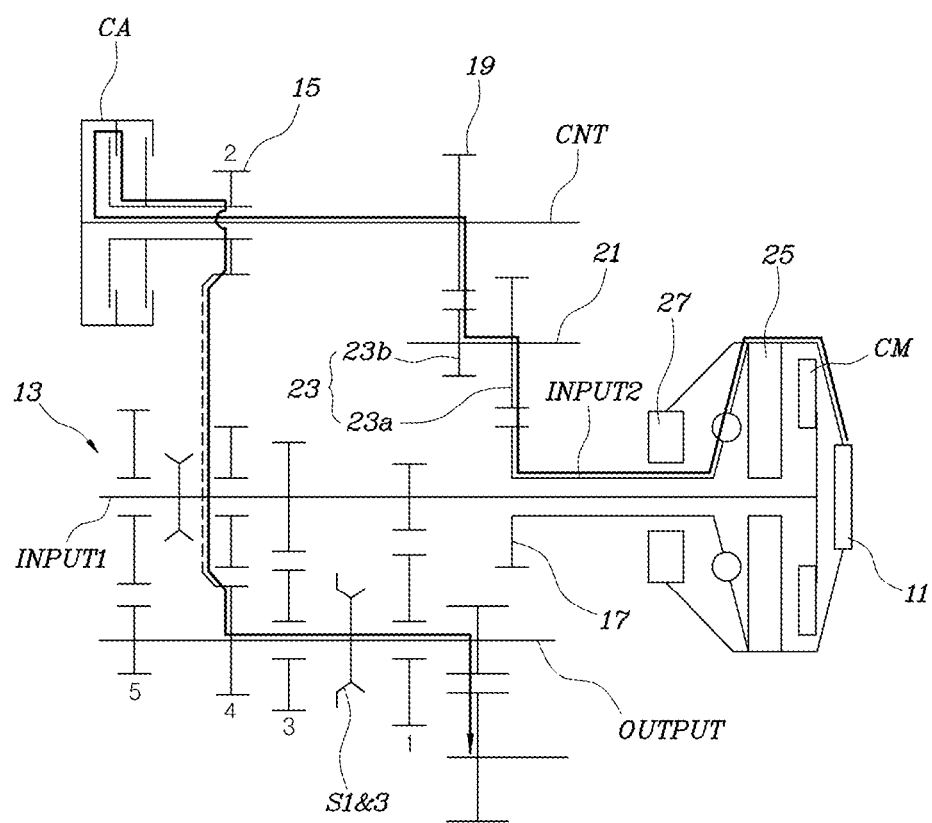

Next, as described in FIG. 3B, the 1 & 3 stage synchronizer (S1 & 3) is disengaged from the 1 stage output gear and the main clutch CM is coupled to ready for the subsequent shifting.

As described above, according to the above configuration, the assist input gear 15 for forming the 2 stage of the present disclosure may be engaged with any one of the output gears of the shifting gear pair, such that the output gear and the synchronizer for forming the 2 stage are unnecessary and the assist input gear 15 is disposed at the side portion of the gearbox part 13, thereby reducing the total length of the transmission to improve the mountability with the vehicle.

In addition, the structure of the gearbox part 13 having the disposition structure of the existing manual transmission is applied to the torque assist AMT according to one form of the present disclosure to share the production line with the existing manual transmission, thereby reducing investment costs of production facilities to save production costs of the transmission.

According to one form of the present disclosure, the assist input gear may be engaged with the output gear of the shifting gear pair to reduce the number of gears and shafts for the torque assist and the assist input gear may be disposed at the side portion of the gearbox part to reduce the total length of the transmission and improve the vehicle mountability.

Further, the disposition structure of the gearbox part is configured to be similar to that of the existing manual transmission to share the production line with the existing manual transmission, thereby saving the production costs of the transmission.

Meanwhile, although specific examples of the present disclosure have been described above in detail, it is obvious to those skilled in the art that various modifications and alterations may be made without departing from the spirit and scope of the present disclosure. In addition, it is obvious that these modifications and alterations are within the following claims.

What is claimed is:

1. An automated manual transmission, comprising:
   a first input shaft configured to receive rotation power from a power source via a main clutch;
   a second input shaft configured to always receive the rotation power from the power source;
   a gearbox part configured to have a plurality of shifting gear pairs having different gear ratios engaged with the first input shaft and an output shaft and select one shifting gear pair suited for a driving speed from the plurality of shifting gear pairs by a synchronizer;
   a counter shaft configured to be disposed in parallel with the output shaft; and
   an assist input gear configured to be coupled with the counter shaft via an assist clutch and engaged with an output gear provided at the output shaft to form a gear ratio of a specific shifting stage.

2. The automated manual transmission of claim 1, wherein the plurality of shifting gear pairs include output gears, and the assist input gear is engaged with any one of the output gears of the plurality of shifting gear pairs provided in the gearbox part.

3. The automated manual transmission of claim 1, further comprising:
   an idler gear set configured to be provided on a power transfer path from the second input shaft to the output shaft through the counter shaft and transferring the rotating power of the power source, which is provided at the second input shaft, to the output shaft.

4. The automated manual transmission of claim 3, wherein the idler gear set includes:
 a first transfer gear configured to be provided at the second input shaft;
 a second transfer gear configured to be provided at the counter shaft;
 an idler shaft configured to be disposed in parallel with the second input shaft and the counter shaft; and
 an idler gear configured to be provided at the idler shaft and engaged with the first transfer gear and the second transfer gear.

5. The automated manual transmission of claim 4, wherein the idler gear includes:
 a first idler gear configured to be engaged with the first transfer gear while being paired with the first transfer gear;
 a second idler gear configured to be engaged with the second transfer gear while being paired with the second transfer gear; and
 at least one of a gear ratio formed by having the first transfer gear and the first idler gear pairing with each other and a gear ratio formed by having the second transfer gear and the second idler gear pairing with each other forms a reduction gear ratio.

6. The automated manual transmission of claim 1, wherein the second input shaft is formed as a hollow shaft so that the first input shaft is inserted into the second input shaft, and the counter shaft is disposed at a side portion of the gearbox part.

7. The automated manual transmission of claim 1, wherein the main clutch is disposed between the power source and a flywheel, the main clutch is directly connected to the first input shaft, and the second input shaft is formed as a hollow shaft to enclose the first input shaft.

* * * * *